United States Patent [19]

Lewis

[11] Patent Number: 4,787,179
[45] Date of Patent: Nov. 29, 1988

[54] ABRASIVE BLASTING CONTAINMENT SYSTEM

[76] Inventor: Richard E. Lewis, 7728 Bedfordshire Dr., Charlotte, N.C. 28226

[21] Appl. No.: 83,449

[22] Filed: Aug. 10, 1987

[51] Int. Cl.⁴ .............................................. B21C 9/00
[52] U.S. Cl. ........................................ 51/426; 51/424; 51/429
[58] Field of Search ................ 51/426, 424, 425, 427, 51/273, 410, 429; 98/40.01, 40.05, 40.1, 115.4; 239/462; 118/326

[56] References Cited

U.S. PATENT DOCUMENTS

| | | | |
|---|---|---|---|
| Re. 27,314 | 3/1972 | Codina | 51/429 |
| 1,773,374 | 8/1930 | Ruemelin | 51/426 |
| 1,977,386 | 10/1934 | Holes | 51/410 |
| 2,912,918 | 11/1959 | Mead | 51/425 |
| 2,935,820 | 5/1960 | Mead | 51/426 |
| 4,133,255 | 6/1979 | Guice | 118/326 |

Primary Examiner—Frederick R. Schmidt
Assistant Examiner—Blynn Shideler
Attorney, Agent, or Firm—Bell, Seltzer, Park & Gibson

[57] ABSTRACT

A tent-like portable blasting room enclosure is provided with a central entry opening in the roof. Air is circulated through the blasting room enclosure and exits through spaced parallel air return ducts extending along the lower edges of the opposite side walls of the blast room enclosure through a closed loop abrasive conveying air stream. Inlet air diffusers are provided in the upper portion of the blasting room enclosure for uniformly distributing the air introduced into the blast room in a downward direction without creating turbulence in the blast room. The parallel air return ducts extend outwardly beyond the blasting room enclosure and define a second floor area adjacent the first floor area beneath the blasting room enclosure. The blasting room enclosure is mounted on rollers and a track extends parallel with the air return ducts to permit the blasting room enclosure to be moved between the first and second floor areas so that parts to be cleaned can be removed and replaced in the open floor area while sandblasting is taking place in the other adjacent floor area.

8 Claims, 2 Drawing Sheets

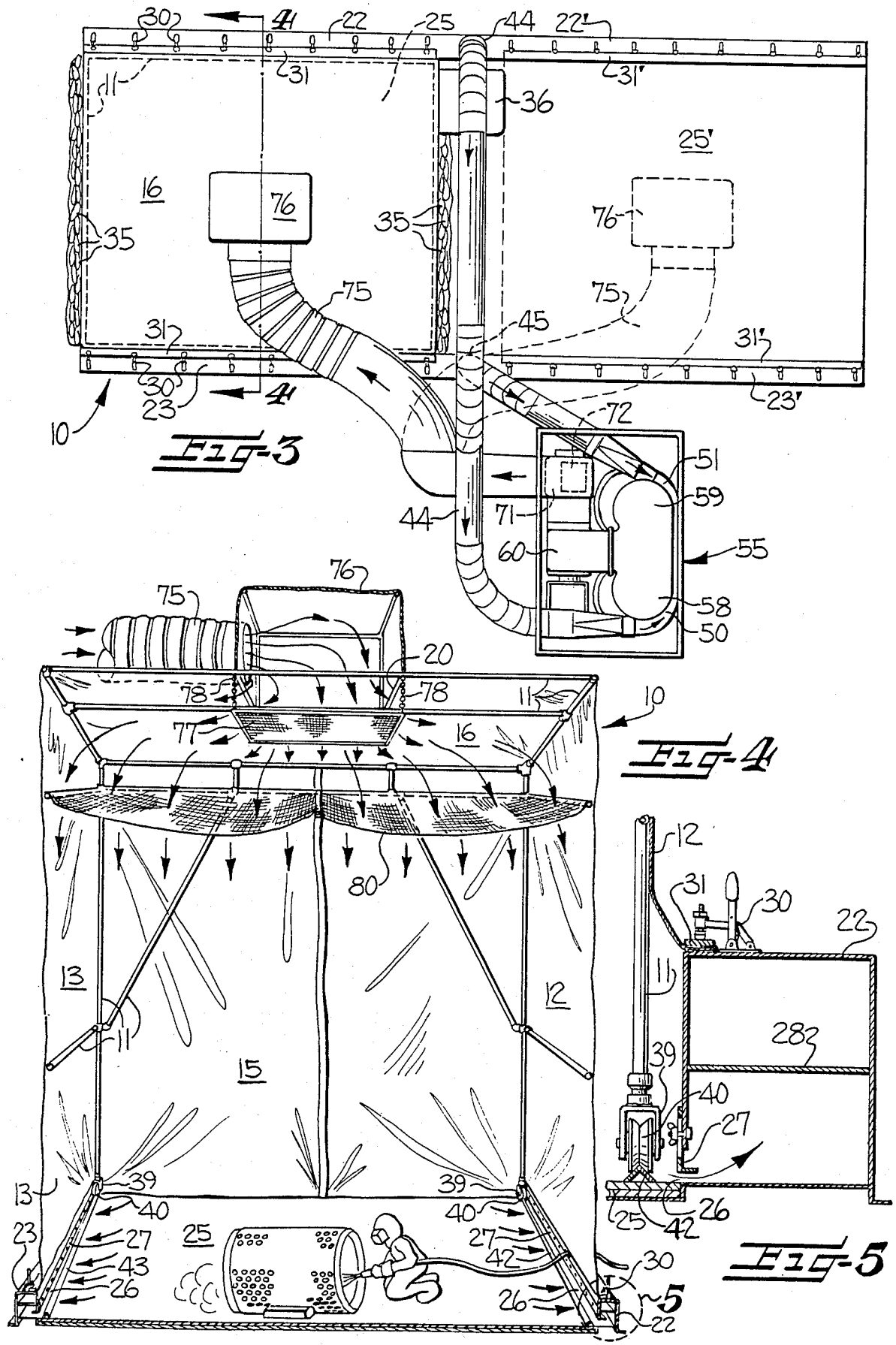

ABRASIVE BLASTING CONTAINMENT SYSTEM

FIELD OF THE INVENTION

This invention relates generally to an abrasive blasting containment system adapted for cleaning large steam turbines and the like and for preventing the escape of abrasive blasting particles into the surrounding atmosphere, and more particularly to such a system including a portable blasting room enclosure and an air circulating arrangement providing a closed loop conveying air stream entering the upper end portion of the blasting room and exiting through the lower portion of the blasting room with abrasive separator means for removing the abrasive before the air stream is again introduced into the upper end of the blasting room.

BACKGROUND OF THE INVENTION

It is known to provide permanently installed abrasive blast rooms provided with an air circulation and abrasive removal system so that the spent abrasive from the blast hose is reclaimed and can be returned for use in the blast hose. In most of these conventional permanent type of blast room installations, the exhaust air, after removal of the abrasive, is exhausted to the atmosphere. Because it is almost impossible to remove all of the abrasive particles from the exhausted air, the blast room is located in a remote position away from all operating equipment which needs to be cleaned on a regular schedule.

With this type of permanent blast room installation, objects to be cleaned in the blast room must be transported from the location where they normally operate to the remotely located blast room and returned after cleaning. When the objects to be cleaned are used as vital operating parts of a larger system, such as the turbines of a large electric generating plant, the removal of the turbines and transportation to the blasting room and return results in the electric generating plant being out of operation for a considerable length of time and this results in a considerable cost because of the loss of revenue from the electric generating system not being operable for a considerable length of time.

Abrasive blast cleaning at a location close to the operation site would provide a considerable savings over the system where the parts are transported to the blast abrasive cleaning operation and then returned to the operation's site. However, currently available onsite abrasive cleaning systems produce large amounts of dust which can escape and contaminate the machinery operating nearby, increase the clean-up cost, and further complicate the regular maintenance operations. Contamination by abrasive particles of critical oil seals, bearings and motor windings during scheduled cleaning of certain parts can actually cause equipment failure and increase the number of unscheduled maintenance operations.

SUMMARY OF THE INVENTION

With the foregoing in mind, it is an object of the present invention to provide an abrasive blasting containment system which is portable and can be set up closely adjacent the machinery which includes the parts that have to be cleaned on a regular schedule, and which includes a closed loop conveying air stream preventing the escape of abrasive blasting particles into the environment surrounding the abrasive blasting containment system.

The abrasive blasting containment system of the present invention is particularly adapted for cleaning large turbines and the like normally employed in electric generating plants and includes a portable blasting room enclosure covering a floor area where the abrasive blast cleaning operation takes place. The blasting room enclosure includes a substantially square open frame, flexible opposite side and end walls, and a flexible roof including a central air inlet opening therein. A closed loop conveying air stream is circulated downwardly through the blasting room enclosure by an air circulating system including a pair of elongate and spaced parallel air return ducts extending along the lower edges of the opposite side walls of the blast room. The air return ducts define opposite side boundaries of a solid floor area beneath the blasting room enclosure and are positioned above the level of the floor. A pipe system communicatively interconnects the air return ducts, an abrasive separator, a blower, and the central opening in the roof of the blast room enclosure. An inlet air diffuser is spaced below and parallel with the roof of the enclosure and covers the air entry opening for uniformly distributing the air introduced into the blast room so that the air passes downwardly through the blast room and into the parallel air return ducts at the lower ends of the opposite side walls without creating turbulence in the blast room.

The pair of elongate spaced parallel air return ducts extending along the lower edges of the opposite side walls of the blast room preferably extend outwardly therebeyond to define a second floor area adjacent the floor area beneath the blasting room enclosure. The portable blasting room open frame member is supported on rollers for movement of the blasting room between the first and second floor areas so that productivity can be increased by permitting one floor area to be loaded or unloaded by an overhead crane system while abrasive cleaning, usually referred to as sandblasting, is being performed concurrently on the other floor area. After sandblasting of parts is completed on one floor area, the portable blasting room enclosure can be moved to cover the other newly loaded floor area, leaving the cleaned parts such as turbines, rotors, diaphragms, turbine shells, and the like uncovered so that they can be easily removed by an overhead crane, without delay.

This two-floor area arrangement significantly reduces overhead crane scheduling conflicts and permits cleaned parts to be removed and permits parts to be cleaned to be moved into proper position on a very flexible overhead crane schedule. The down draft air flow through the blasting room enclosure is carefully designed and controlled so that abrasive particle suspension time is greatly reduced and visibility in the blasting room enclosure is improved. High operator visibility within the portable blasting room enclosure is maximized by a two-stage cleaning system which continuously cleans and recycles a high volume of air in the blast room enclosure, on the order of about 2.4 times per minute. Even though the air is continuously and frequently recycled, the air stream passing downwardly through the portable blasting room enclosure does not create turbulence in the blast room.

The gentle downflow of the air stream is uniformly distributed by forming an air diffuser of precisely woven open mesh material spaced below the roof and covering the entire area of the upper portion of the portable blasting room enclosure. Although the blower supplies air to the upper portion of the portable blasting room at the rate of 14,000 CFM, the conveying air stream passing downwardly through the open mesh diffuser is uniformly distributed throughout the entire area of the portable blasting room enclosure. To insure a contamination free area around the blasting room, a negative pressure is maintained in the portable blasting room enclosure by removing a small percentage of air from the closed loop air stream and this prevents any of the abrasive blasting material and the removed material from contaminating the environment of the abrasive blasting containment system. Also, the air removed from the air stream is filtered by a series of self-cleaning cartridge filters before being released into the atmosphere. A detachable entrance foyer is provided on one wall of the blasting room to minimize the workers tracking dust and abrasive particles outside of the blast room enclosure. The entrance foyer also provides a blowdown area for workers exiting the portable blasting room enclosure.

BRIEF DESCRIPTION OF THE DRAWINGS

Other objects and advantages will appear as the description proceeds when taken in connection with the accompanying drawing in which

FIG. 3 is a plan view looking downwardly on FIG. 2;

FIG. 4 is an enlarged vertical sectional perspective view through the tent enclosure, being taken substantially along the line 4—4 in FIG. 3; and FIG. 5 is enlarged vertical sectional view through one of the return air ducts, being an enlargement of the lower right-hand portion of FIG. 4 enclosed by the dotted circle 5.

DESCRIPTION OF THE ILLUSTRATED EMBODIMENT

Figure 1:
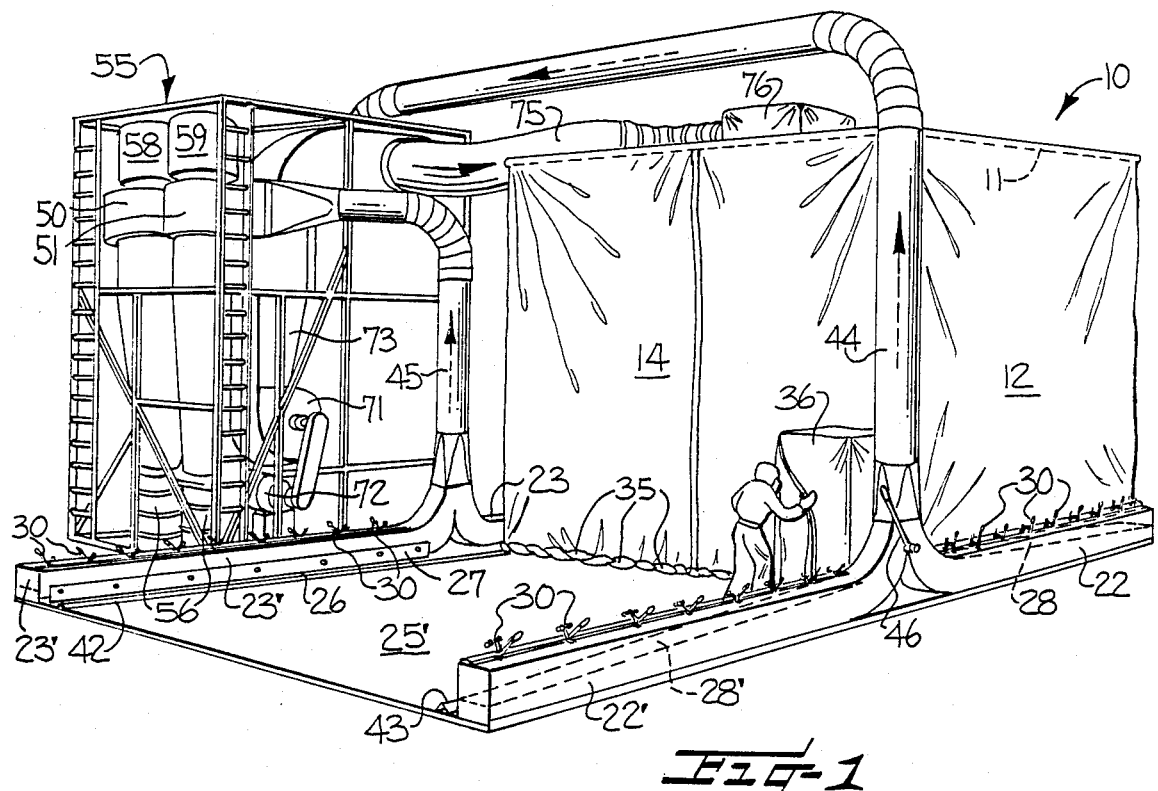
FIG. 1 is a perspective view looking at one end and one side of the abrasive blasting containment system of the present invention.

As shown in the drawings, the abrasive blasting containment system of the present invention is portable so that it can be readily moved from place to place and can be located near the equipment to be cleaned so that on-site sandblasting can be carried out in an economical and efficient manner. As used herein, the term "sandblasting" is used to refer to any type of abrasive blast cleaning.

A portable blasting room enclosure or tent, broadly indicated at 10, is supported on a substantially square open frame member constructed of quick-connect vertical and horizontal pipe members 11 with suitable diagonal bracing. The pipe sections 11 are precut and prefitted to insure fast and accurate assembly and disassembly.

The tent enclosure 10 is formed of industrial grade flame-resistant vinyl fabric to minimize air and abrasive particle leakage and to maximize abrasive resistance and includes flexible fabric opposite side walls 12, 13 and flexible fabric opposite end walls 14, 15. A flexible fabric roof or ceiling 16 is connected at the peripheral edges to the side walls 12, 13 and end walls 14, 15 and is provided with a central air inlet opening 20 (FIG. 4) therein.

Air circulating means is provided for forming a closed loop conveying air stream continuously passing downwardly through the tent 10 and includes a pair of elongate and spaced parallel air return ducts 22, 23 extending along the lower edges of the opposite side walls 12, 13 and defining opposite side boundaries of a first solid floor area 25 extending beneath the tent 10. The air return ducts 22, 23 are positioned above the level of the solid floor area 25 and also extend outwardly beyond the tent 10, as indicated at 22', 23' and define opposite side boundaries of a second solid floor area 25' positioned in side-by-side relationship with the first floor area 25 and extending between the air return ducts 22', 23'. The air return ducts 22', 23' and the second floor area 25' therebetween are provided to permit the tent 10 to be easily moved from a position covering the first floor area 25 to a position covering the second floor area 25', in a manner to be presently described.

The outer surfaces of each of the air return ducts, as illustrated at 22 in FIG. 5, are substantially square in cross section and are provided with an air entrance slot 26 extending along the lower inner portions thereof. A vertically adjustable plate 27 is provided for varying the size of the air entrance slot 26. Also, an upper inner wall 28 (FIG. 5) is provided in the air return duct 22. As indicated in FIG. 1, the upper inner wall 28 is inclined downwardly in each direction from the adjacent ends of the air return ducts 22, 22' to define tapered air return inlets for the purpose of balancing the air being withdrawn from the tent 10. Quick-release clamp members 30 are fixed in spaced apart relationship along the upper walls of each of the air return ducts 22, 22', 23, and 23' and may be moved into clamping relationship with the upper surface of a clamp bar 31 for releasably attaching the lower edge portions of the side walls 12, 13 to the respective air return ducts.

The lower edges of the end walls 14, 15 of the tent 10 are maintained in position by placing sand bags 35 on the lower edge portions of the end walls 14, 15 to maintain an airtight connection with the floor 25. It is preferred that a detachable entrance foyer 36 be provided to cover an entry opening in the end wall 14 to provide a blow down area for workers exiting and entering the portable blasting room enclosure and to minimize the workers tracking dust and abrasive particles outside of the blast room, as illustrated in FIG. 1. The entrance foyer 36 is also formed of the flexible vinyl fabric of which the tent 10 is constructed and is provided with a suitable frame, not shown, for supporting the same.

The lower ends of the vertically extending pipes 11 forming the legs for supporting the open frame are provided with brackets 39 supporting grooved rollers or wheels 40 (FIG. 5). The rollers 40 are mounted for movement along elongated tracks 42, 43 extending along and parallel with the air return ducts 22, 23 and supported on the side-by-side floor areas 25, 25'.

Figure 2:
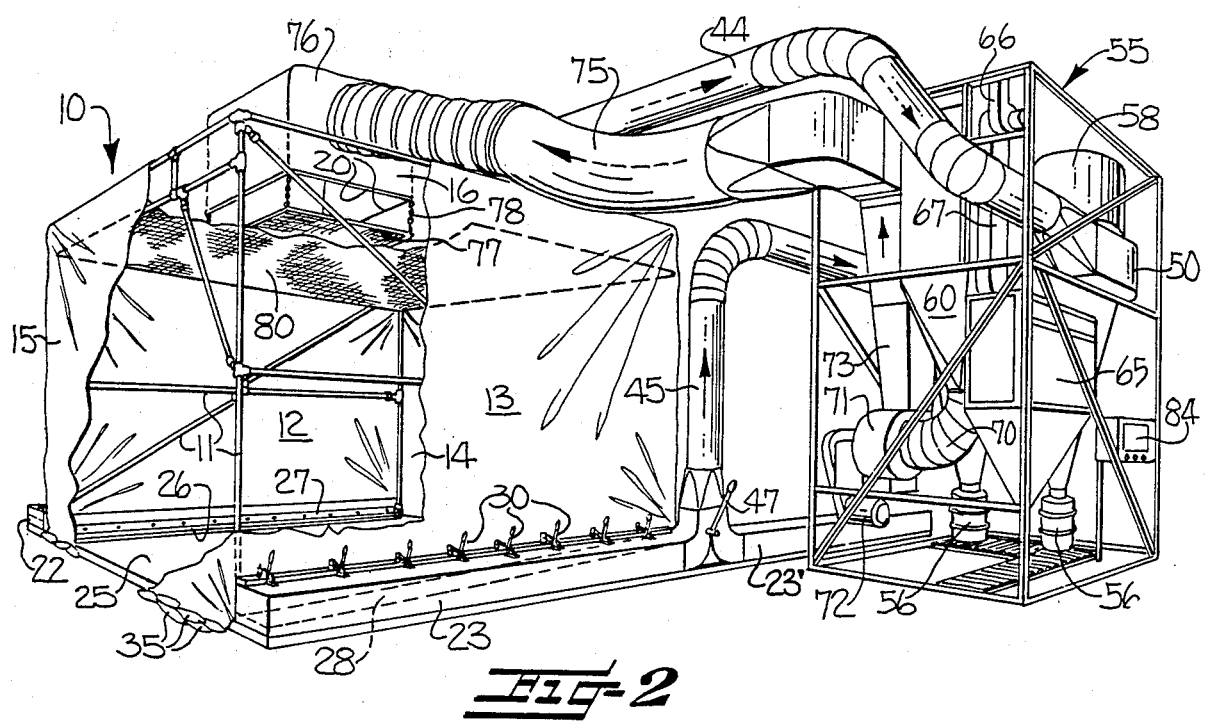
FIG. 2 is a view similar to FIG. 1 but looking at the opposite end and side of the containment system and with portions, of the tent enclosure broken away to show portion of the interior and he supporting frame therefor.

As will be noted in FIGS. 1 and 2, the air return ducts 22, 22' and 23, 23' are joined at their inner ends to the lower ends of vertically extending corresponding air return pipes 44, 45. A switch valve is supported in the lower portion of the vertical pipes 44, 45, not shown, and is operated by corresponding handles or levers 46, 47 to selectively connect the air return ducts 22, 22' to the vertical air return pipe 44 and to selectively connect the air return ducts 23, 23' to the vertical air return pipe 45, depending upon which position the tent 10 is occupying at the time.

The vertical air return pipe 44 extends upwardly above the level of the tent 10 and horizontally with the other end being connected to abrasive particle separator means, illustrated as a first high efficiency cyclone 50 (FIG. 1). The other vertical air return pipe 45 has its upper end connected to a second high efficiency cyclone 51. Both of the cyclone particle separators 50, 51 are supported in an open support frame structure, broadly indicated at 55. The lower portions of the twin high efficiency cyclones 50, 51 taper downwardly and terminate at a position above the lower portion of the support platform 55 to accommodate a particle removable support for barrels 56, into which the removed dust and abrasive particles are deposited.

The two high efficiency centrifugal particulate separators 50, 51 initially receive the abrasive laden air from the tent 10 and the separated abrasives are dropped from the cyclones and fall into recovery barrels 56. The clean air from the cyclones 50, 51 is exhausted into a conventional type of scroll ducts 58, 59 and the air is then directed into a self-cleaning inertial separator 60 (FIG. 3). A self-cleaning cartridge filter system 65 is connected to the inertial separator 60. A balancing air exhaust blower 66 (FIG. 2) is connected by a pipe 67 to the cartridge filter 65 and is operative to remove a small volume of balancing air from the closed loop system in order to maintain the proper negative pressure within the tent 10 and to provide maximum filter efficiency. This negative pressure within the tent 10 insures that no abrasive particles escape from the enclosure. This balancing air is also used to pull any trapped abrasive from the inertial separator 60 and to filter the same before it is released into the atmosphere by the balancing air fan blower 66.

The self-cleaning cartridge filter system 65 insures that balancing air discharged from the system into the atmosphere by the balancing air fan or blower 66 is clean. When further cleaning of the discharge air is necessary or special consideration must be given to radioactive gas-phrase filtration, a conventional type of HEPA filtration assembly, not shown, may be added to the air circulation system of the present invention.

Air leaving the lower end of the inertial separator 60 enters a return pipe 70 (FIG. 2) and is directed into the inlet of a centrifugal blower 71, driven by a drive motor 72. The outlet side of the centrifugal blower 71 is provided with a vertical duct 73 (FIG. 2) extending upwardly therefrom and being supported by the open frame 55. The upper end of the vertical duct 73 is connected to one end of a flexible inlet duct 75, the opposite end of which extends over to and is connected to an air plenum chamber 76 located on the center of the top wall 16 of the tent 10.

In order to insure a uniform downward movement of air in the tent 10, inlet air diffuser means is provided in the upper portion of the tent 10, as best illustrated in FIG. 4. The inlet air diffuser means includes a first diffuser 77, comprising a precisely woven open mesh synthetic fabric fixed to a frame and suspended from the roof 16 by chains 78. The air is then directed downwardly through a second diffuser 80, also formed of open mesh woven fabric. The second diffuser 80 extends entirely across the tent 10 and the outer edges are suitably connected to the side walls 12, 13 and end walls 14, 15. The diffusers 78 and 80 equalize the air volume and velocity to a calculated rate at a static pressure and the static pressure eliminates any air movement and resulting vortex trails which decrease visibility in the tent 10 so that the air is uniformly distributed in a downward direction into the parallel air return ducts 22, 23 at the lower opposite sides of the tent 10, without creating turbulence in the tent.

While sandblast cleaning of particular parts is being carried out in the tent 10 when located over the first floor area 25, as illustrated in FIG. 4, an overhead crane or the like can be operated to position other parts to be cleaned on the adjacent floor area 25', without having to wait for the cleaning and removal of the parts from the floor area 25. The air circulation system is preferably controlled from a suitable control panel 84, supported on the open frame 55.

After one group of parts have been sandblasted with the tent 10 in the position illustrated above the first floor area 25, the blasting room tent 10 can be easily moved to position the same over the second floor area 25', thereby exposing the cleaned parts for easy removal with an overhead crane and forming an enclosure around the parts to be cleaned which have been placed on the second floor area 25'. In order to move the tent enclosure 10 from a position above the first floor area 25 to a position above the second floor area 25', the vertically slit opposite ends 14, 15 of the tent are opened up, after removing the sand bags 35. After releasing the lower edges of the side walls 12, 13 by releasing the quick-clamp members 30, the pipe frame 11 is simply rolled along the corresponding tracks 42, 43. The opposite lower edges of the side walls 12, 13 are then clamped in position on the corresponding air return ducts 22', 23' and the opposite end walls 14, 15 are closed and the lower edges sealed by placing the sand bags 35 thereon. The air gate valve levers 46, 47 are reversed to connect the air return ducts 22', 23' to the vertical air return pipes 44, 45 and the closed loop conveying air stream will be activated to flow through the tent 10 when positioned over the second floor area 25' so that cleaning of these parts can take place.

As a specific but nonlimiting example, it has been found that a satisfactory abrasive blasting containment system is provided when the distance between the return air ducts 22, 23 is approximately 17 feet. The width of the tent 10 is preferably 20 feet, and the tent 10 is 18 feet high. With this size of portable blasting room enclosure or tent 10, a 14,000 cubic feet per minute blower 71 has been found to provide sufficient volume of air to provide a closed loop conveying air stream which is sufficient to remove the dust and abrasive particles from the inside of the tent 10 and provide sufficient visibility, also providing zero contamination outside of the enclosure tent 10. As the inlet air stream leaves the blower 71 and passes through the inlet duct 75, the air velocity is reduced from approximately 2,000 feet per minute to 600 feet per minute before entering the air plenum chamber 76 located on the upper portion of the tent 10. The first open mesh diffuser 77 is six feet square and is suspended by the chains 78 about six inches below the top wall 16. The second open mesh diffuser 80 is suspended about six inches below the first diffuser 77. Each of the open mesh diffusers 77, 80 is woven to provide approximately 50 percent open areas therein. With this size of tent 10, approximately 3,400 square feet of working area is available inside of the tent 10. While a specific example is given, it is to be understood that tent enclosures 10 of various sizes can be utilized, depending upon the particular type of machinery to be cleaned or sandblasted.

In the drawings and specification there has been set forth the best mode presently contemplated for the practice of the present invention, and although specific terms are employed, they are used in a generic and descriptive sense only and not for purposes of limitation, the scope of the invention being defined in the claims.

That which is claimed is:

1. An abrasive blasting containment system particularly adapted for cleaning large turbines and the like and for preventing the escape of abrasive blasting particles, said system comprising
    a portable blasting room enclosure including a substantially square open frame member, flexible opposite side and end walls, and a roof supported on said frame and including a central air entry opening therein,
    air circulating means including a blower, a pair of elongate and spaced parallel air return ducts extending along the lower edges of said opposite side walls of said blast room enclosure and defining opposite side boundaries of a first solid floor area beneath said blasting room enclosure, said spaced parallel air return ducts also extending outwardly beyond said blast room enclosure and defining opposite side boundaries of a second solid floor area extending between said air return ducts and adjacent the first floor area beneath said blasting room enclosure, said air return ducts being positioned above the level of said solid floor, abrasive particle separator means, and pipe means communicatively interconnecting said air return ducts, said abrasive separator means, said blower, and said central opening in said roof of said blast room enclosure to provide a closed loop conveying air stream through said blasting room enclosure,
    inlet air diffuser means extending parallel to and spaced below said roof and covering the air entry opening therein for uniformly distributing the air introduced into said blast room in a downward direction and into said parallel air return ducts without creating turbulence in said blast room,
    track members extending parallel with and along the length of said air return ducts, and
    roller means supporting the lower portion of said portable blasting room enclosure, said roller means being mounted on said track means to permit rolling movement of said portable blasting room enclosure between positions covering said first and second floor areas.

2. An abrasive blasting containment system according to claim 1 wherein said air return ducts define tapered air returns, and include air entrance slots extending along the lower inner edge portions thereof.

3. An abrasive blasting containment system according to claim 2 including adjustment plate means secured to the inner lower surfaces of said air return ducts and having lower edges which are vertically adjustable to vary the size of said air entrance slots extending along the lower inner edge portions of said air return ducts.

4. An abrasive blasting containment system according to claim 2 including quick-release clamp means fixed to the upper surface of each of said air return ducts and being manually operable to releasably clamp the lower edges of said side walls of said room enclosure thereto.

5. An abrasive blasting containment system according to claim 1 wherein said inlet air diffuser means includes a first diffuser suspended below said central air entry opening in said roof of said blasting room enclosure, said first diffuser being slightly larger than said central air entry opening, and a second air diffuser positioned below said first air diffuser and having outer peripheral edges secured to the corresponding side and end walls of said portable blasting room enclosure.

6. An abrasive blasting containment system according to claim 5 wherein each of said first and second air diffusers comprise woven open mesh synthetic fabric providing approximately 50 percent open areas therein.

7. An abrasive blasting containment system according to claim 1 including manually operable air selector means located in the center of each of said elongate spaced parallel air return ducts for selectively connecting portions of said air return ducts to said air circulating means which correspond to the floor areas over which the portable blasting room enclosure is positioned.

8. An abrasive blasting containment system particularly adapted for cleaning large turbines and the like and for preventing the escape of abrasive blasting particles, said system comprising
    a portable blasting room enclosure including a substantially square open frame member, flexible fabric opposite side and end walls, and a roof supported on said frame and including a central air entry opening therein,
    air circulating means including a blower, a pair of elongate and spaced parallel air return ducts extending along the lower edges of said opposite side walls of said blast room enclosure and defining opposite side boundaries of a first solid floor area beneath said blasting room enclosure, abrasive particle separator means, and pipe means communicatively interconnecting said air return ducts, said abrasive separator means, said blower, and said central opening in said roof of said blast room enclosure to provide a closed loop conveying air stream through said blasting room enclosure, said spaced parallel air return ducts extending outwardly beyond said blast room enclosure and defining opposite side boundaries of a second solid floor area adjacent said first floor area,
    inlet air diffuser means extending parallel to and spaced below said roof and covering the air entry opening therein for uniformly distributing the air introduced into said blast room in a downward direction and into said parallel air return ducts without creating turbulence in said blast room, and
    roller means supporting said blast room for selective movement between positions covering said first and second floor areas.

* * * * *